(12) United States Patent
Brunner et al.

(10) Patent No.: US 11,702,875 B2
(45) Date of Patent: Jul. 18, 2023

(54) BIFOLD DOOR WITH SPHERICAL BEARING AND PIN

(71) Applicant: The Boeing Company, Chicago, IL (US)

(72) Inventors: Jordan R. Brunner, Seattle, WA (US); Nicholas J. Lewis, Mukilteo, WA (US); Erik Nilsen, Seattle, WA (US)

(73) Assignee: THE BOEING COMPANY, Arlington, VA (US)

( * ) Notice: Subject to any disclaimer, the term of this patent is extended or adjusted under 35 U.S.C. 154(b) by 482 days.

(21) Appl. No.: 16/860,918

(22) Filed: Apr. 28, 2020

(65) Prior Publication Data

US 2021/0332627 A1 Oct. 28, 2021

(51) Int. Cl.
| | |
|---|---|
| *E05D 15/26* | (2006.01) |
| *E06B 3/48* | (2006.01) |
| *B60J 5/06* | (2006.01) |
| *E05D 5/12* | (2006.01) |
| *E05D 3/02* | (2006.01) |
| *B64C 1/14* | (2006.01) |

(52) U.S. Cl.
CPC .......... *E05D 15/264* (2013.01); *B64C 1/1461* (2013.01); *E05D 3/02* (2013.01); *E05D 5/12* (2013.01); *E06B 3/481* (2013.01); *B60J 5/062* (2013.01); *E05Y 2900/502* (2013.01)

(58) Field of Classification Search
CPC ......... E06B 3/481; E05D 15/264; E05D 3/02; E05D 5/12; E05D 11/04; E05D 7/06; Y10T 16/524; B64C 1/1461; B60J 5/062
See application file for complete search history.

(56) References Cited

U.S. PATENT DOCUMENTS

| | | | | |
|---|---|---|---|---|
| 1,156,765 | A * | 10/1915 | Ely | E05D 11/04 4/236 |
| 1,318,433 | A * | 10/1919 | Berardinelli | E05D 15/266 160/206 |
| 2,096,311 | A * | 10/1937 | Val | E05D 11/04 16/245 |
| 2,374,925 | A * | 5/1945 | Corso | E06B 3/481 160/40 |
| 3,278,981 | A * | 10/1966 | David | E05D 7/1061 D8/323 |
| 3,346,910 | A * | 10/1967 | Dickinson | E05D 3/12 16/371 |
| 3,685,094 | A * | 8/1972 | Goossev | E05D 7/06 16/224 |
| 4,295,514 | A | 10/1981 | Johnson | |
| 4,731,904 | A | 3/1988 | Sprague | |
| 4,799,288 | A * | 1/1989 | Kimizawa | F16C 11/0657 174/153 G |
| 4,864,690 | A * | 9/1989 | Chen | E05D 7/06 16/386 |
| 5,119,870 | A | 6/1992 | Rabberman | |

(Continued)

*Primary Examiner* — Justin B Rephann
(74) *Attorney, Agent, or Firm* — Alleman Hall Creasman & Tuttle LLP (57) ABSTRACT

A bifold door includes a first hinge and a second hinge configured to rotatably couple the bifold door to a doorframe. The bifold door includes a slider configured to slide within a track of the doorframe as the bifold door is opened and closed. At least one of the first hinge, the second hinge, and the slider includes a spherical bearing and a pin.

24 Claims, 11 Drawing Sheets

(56) References Cited

U.S. PATENT DOCUMENTS

| | | | | |
|---|---|---|---|---|
| 5,940,934 A * | 8/1999 | Turner | ................. | E05D 7/1011 |
| | | | | 16/257 |
| 2012/0031005 A1* | 2/2012 | Liao | .................... | E05D 15/063 |
| | | | | 49/360 |
| 2014/0165331 A1* | 6/2014 | Kang | ..................... | E05D 11/04 |
| | | | | 16/224 |
| 2014/0283337 A1* | 9/2014 | Triebold | ............ | F16C 11/0623 |
| | | | | 16/224 |
| 2016/0194068 A1* | 7/2016 | Savian | ................. | B64C 1/1461 |
| | | | | 160/213 |

\* cited by examiner

BIFOLD DOOR WITH SPHERICAL BEARING AND PIN

FIELD

The present disclosure relates generally to mechanical engineering, and more specifically, to the design of bifold doors for aircraft and other transportation apparatuses.

BACKGROUND

Internal doors for transportation apparatuses such as aircraft are typically designed to be able to be stowed and kept out of the way when not in use via features such as hinges or joints. However, moving parts are subjected to impacts, stresses, and the like over a lifetime of a door which can cause poor alignment, loosening, breakage, or jamming of the door. A typical aircraft lavatory door, for example, may experience 1-2 million cycles in its lifetime. The door may experience additional abuse if the design is unintuitive for the user, who may apply loads in ways unintended during design of the door.

Aircraft lavatory doors commonly include pinned pivot joints at the top and bottom corners of the door, to connect the door to a doorframe. This creates large moment arms when the user pushes or pulls on the door, leading to premature wear. In addition, the aircraft is prone to flexing in flight, which can change the shape of the doorframe that the door, with rigid joints, is expected to fit. Misalignment of the door or any components thereof from wear or flexing of the doorframe can increase stress on the door hardware or increase binding and jamming of the door. In worst case scenarios, the door can become stuck and a person may be trapped inside.

SUMMARY

To address the above issues, according to one aspect of the present disclosure, a bifold door is provided herein. In this aspect, the bifold door includes a first hinge and a second hinge configured to rotatably couple the bifold door to a doorframe. The bifold door includes a slider configured to slide within a track of the doorframe as the bifold door is opened and closed. At least one of the first hinge, the second hinge, and the slider includes a spherical bearing and a pin.

Another aspect of the present disclosure relates to a lavatory installed in a transportation apparatus. In this aspect, the lavatory includes a compartment surrounding a lavatory space, and a doorframe in a wall of the compartment. The doorframe includes a track. The lavatory includes a bifold door including a first hinge and a second hinge configured to rotatably couple the bifold door to the doorframe. The bifold door includes a slider configured to slide within the track as the bifold door is opened and closed. At least one of the first hinge, the second hinge, and the slider includes a spherical bearing and a pin.

Still another aspect of the present disclosure relates to a method of manufacturing a bifold door. In this aspect, the method includes providing a first hinge and a second hinge configured to rotatably couple the bifold door to a doorframe. The method includes providing a slider configured to slide within a track of the doorframe as the bifold door is opened and closed. The method includes providing a spherical bearing and a pin to at least one of the first hinge, the second hinge, and the slider.

BRIEF DESCRIPTION OF THE DRAWINGS

FIGS. 9A and 9B show a reduction in moment arms for the bifold door of FIG. 1 compared to a bifold door attached at top and bottom edges, where FIG. 9A shows opening the bifold door by pulling from the outside and FIG. 9B shows opening the bifold door by pushing from the inside.

DETAILED DESCRIPTION

Figure 1:
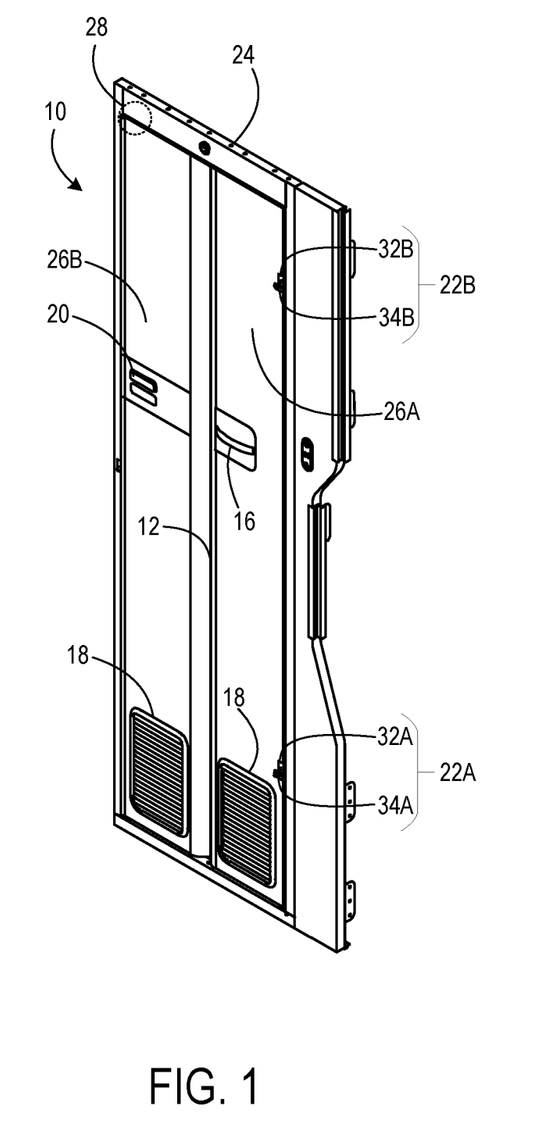
FIG. 1 shows a perspective view of a bifold door according to the present disclosure, in a closed state.
Figure 2:
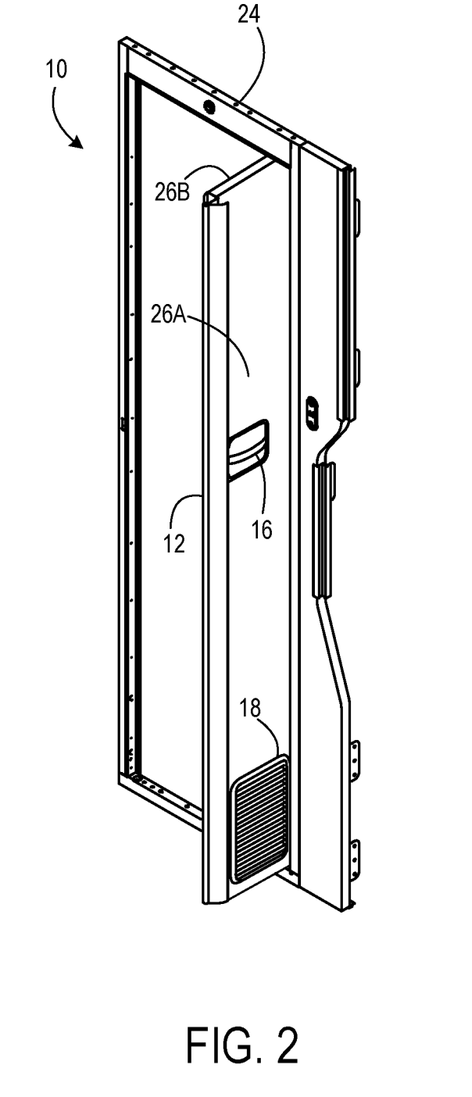
FIG. 2 shows a perspective view of the bifold door of FIG. 1, in an open state.
Figure 3:
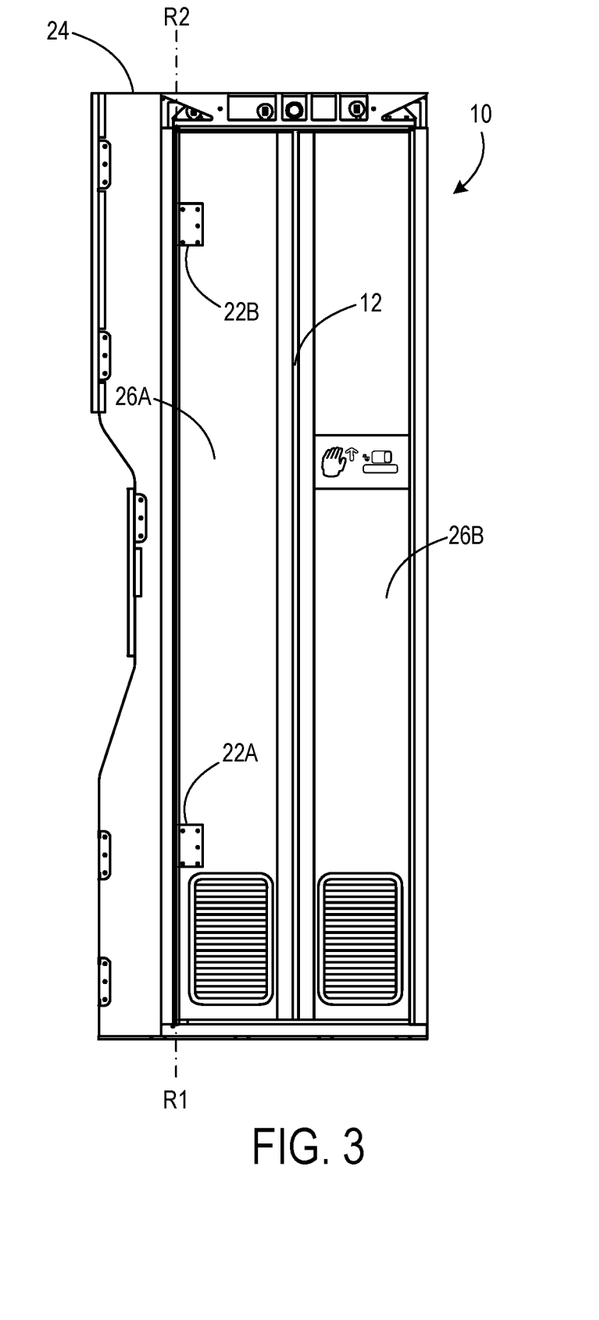
FIG. 3 shows a rear view of the bifold door of FIG. 1.

FIGS. 1-3 show a bifold door 10. The bifold door 10 is configured to fold into two parts about one or more internal hinges 12 when opened, as shown in FIG. 2. When folded, the bifold door is configured to protrude outward from a room or compartment 14 (see FIG. 11) to which the bifold door 10 is installed. The compartment 14 may be small, typically accommodating only a single adult person at a time, whereas the area outside of the compartment 14 may be used by many people walking past, waiting, pushing carts, etc. Accordingly, an outwardly protruding door may be subjected to increased wear and stress compared to an inwardly protruding door.

Figure 11:
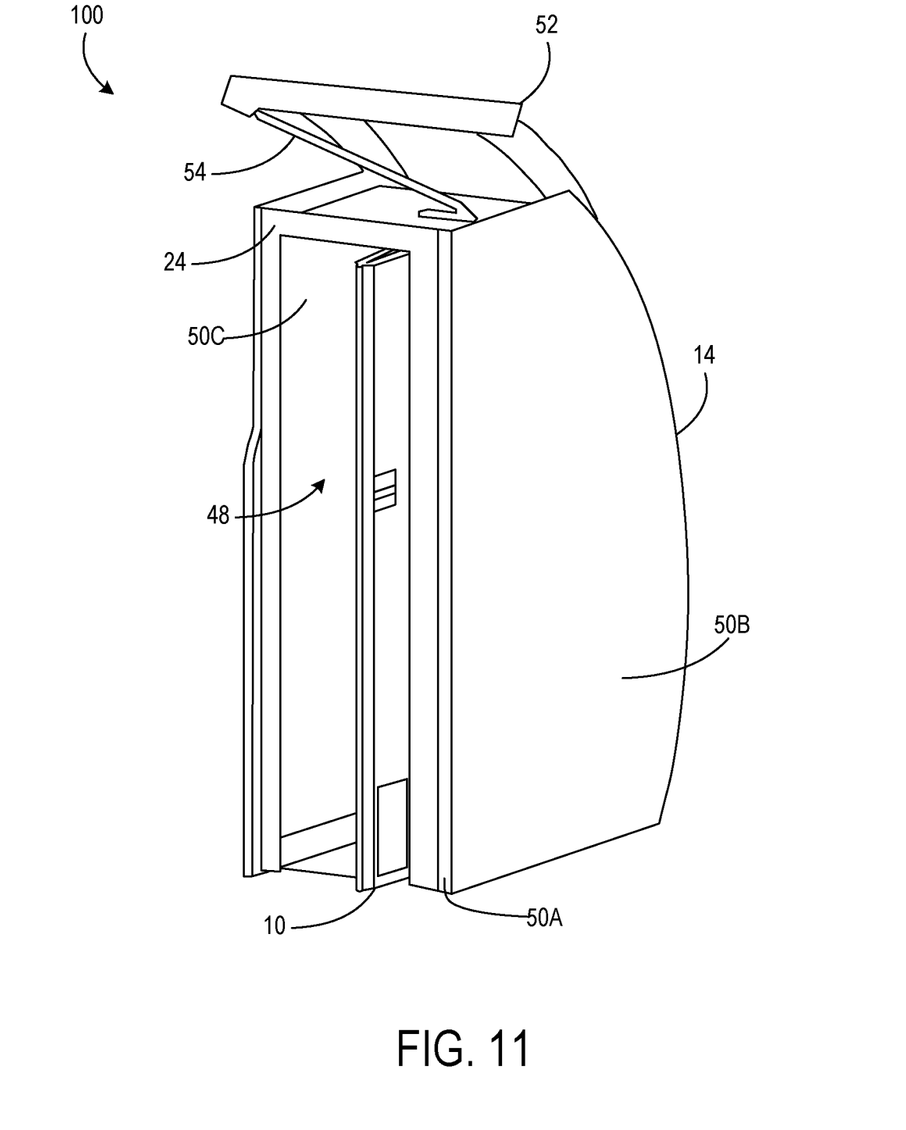
FIG. 11 shows a lavatory according to the present disclosure, including the bifold door of FIG. 1.

The bifold door 10 shown in FIG. 1 is configured to be opened by a user standing outside of the compartment grabbing a handle 16 and pulling outward from the compartment 14 (see FIG. 11). For a user inside the compartment 14, with reference to FIG. 3, as the user pushes outwardly from the compartment 14, the bifold door 10 is configured to slide open while folding in half. The one or more internal hinges 12 are positioned between the two parts of the door. In the depicted embodiment the internal hinge 12 is a single continuous hinge. In other embodiments, a plurality of internal hinges 12 may be provided. The internal hinges 12 may be of a variety of types, such as piano hinges, living hinges, butt hinges, geared hinges, and the like. The bifold door 10 may further include one or more vents 18 for ventilation and decompression and a latch 20 for locking and unlocking the bifold door 10.

Figure 4:
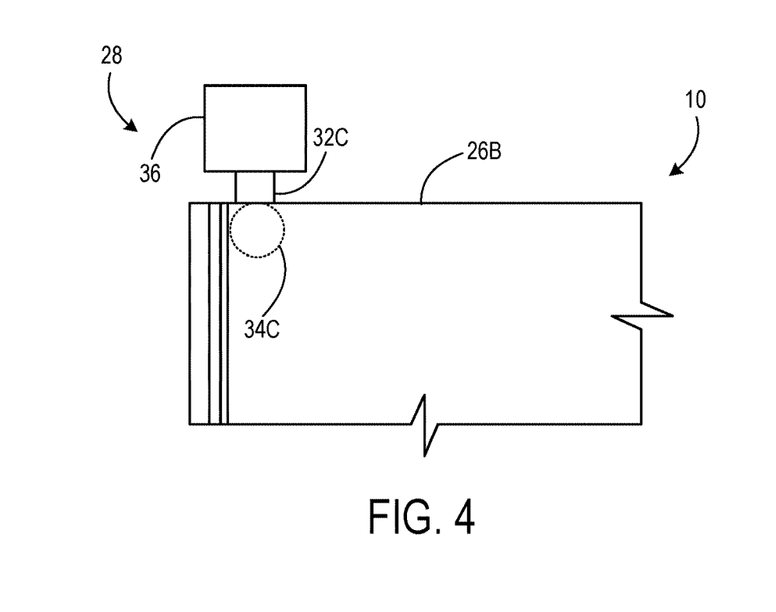
FIG. 4 shows a closeup view of a slider on the bifold door of FIG. 1.
Figure 5:
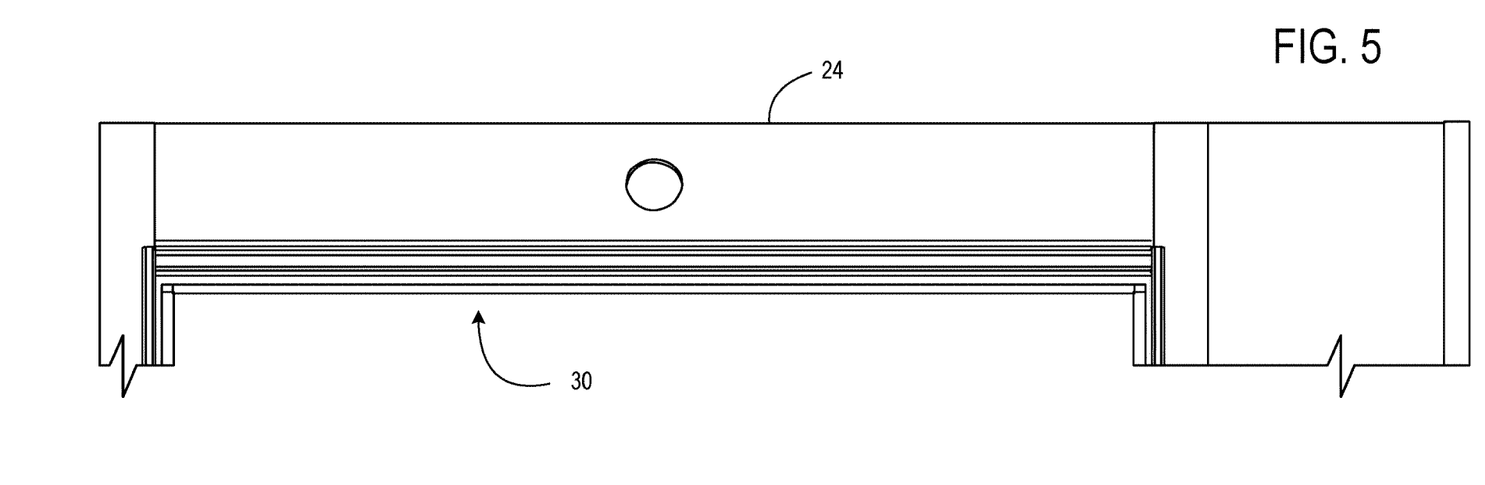
FIG. 5 shows a slightly upward perspective view of a track on a doorframe to which the bifold door of FIG. 1 is attached.

The bifold door 10 includes a first hinge 22A and a second hinge 22B configured to rotatably couple the bifold door 10 to a doorframe 24. Since the first and second hinges 22A, 22B are positioned on a side edge 23S (see FIG. 9A) of a door panel (here, a first panel 26A), when the bifold door 10 is opened or closed, the first panel 26A adjacent the hinges 22A, 22B is configured to rotate about an axis of the two hinges 22A, 22B on the side edge 23S and about the internal hinge 12 on an internal edge, while a second panel 26B connected to the first panel 26A via the internal hinge 12 is configured to rotate about the internal hinge 12 on an internal edge. The bifold door 10 includes a slider 28 configured to slide within a track 30 (FIG. 5) of the doorframe 24 as the bifold door 10 is opened and closed. The slider 28 may be a roller type with one or more wheels or bearings for interfacing with the track 30, a peg type with or without a knob, or the like examples. One example of the slider 28 is shown in the closeup view of FIG. 4, in which the slider 28 is a peg type including a pin (here, a third pin 32C), a bearing (here, a third bearing 34C), and a knob 36. The knob may fit in the track 30, shown in FIG. 5. Thus, a side edge of the second panel 26B may be configured to rotate about an axis of the slider 28 when the bifold door 10 is opened and closed.

Figure 6:
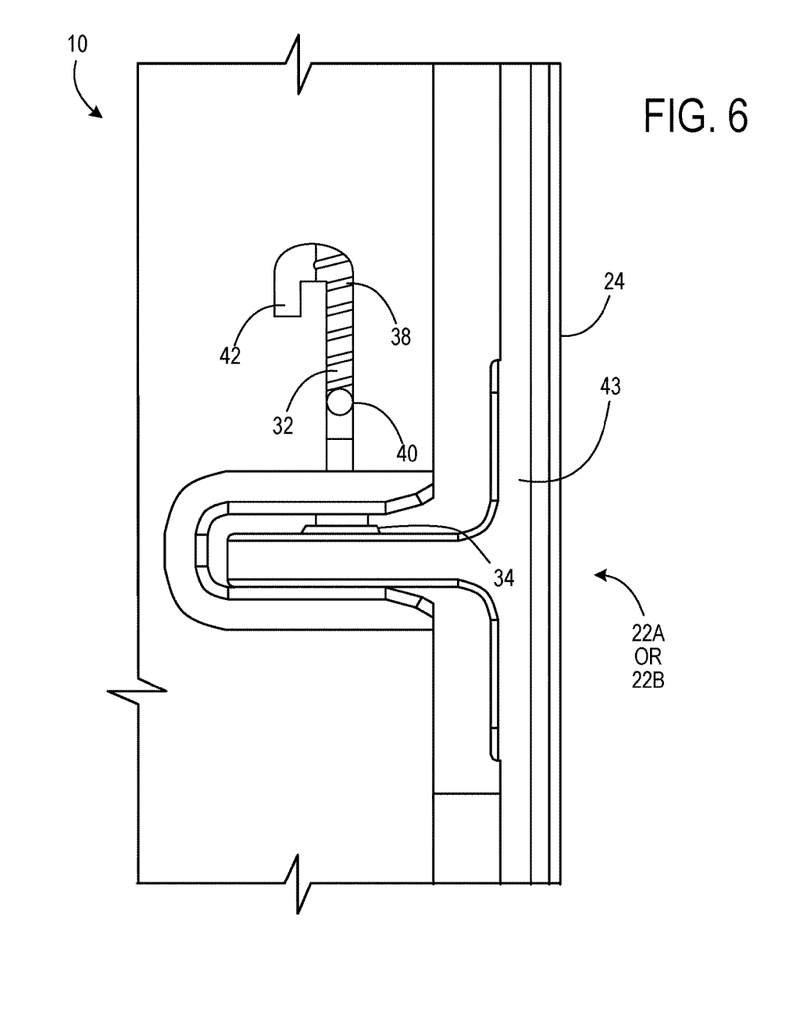
FIG. 6 shows a closeup view of a hinge of the bifold door of FIG. 1, in an attached state.
Figure 7:
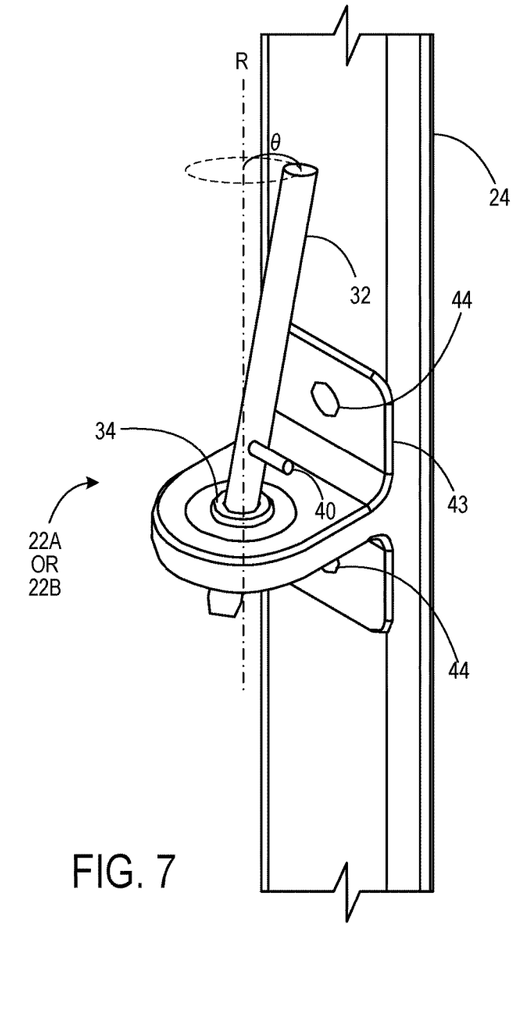
FIG. 7 shows a perspective view of the hinge of FIG. 6, detached from the bifold door.

In the bifold door 10, at least one of the first hinge 22A, the second hinge 22B, and the slider 28 includes a spherical bearing and a pin. Here, the first hinge 22A is positioned vertically below the second hinge 22B. FIGS. 6 and 7 show such a hinge with a spherical bearing 34 and a pin 32, which may be either one of the first hinge 22A or the second hinge 22B. As shown in FIG. 6, the hinge 22A, 22B may include a spring 38 configured to releasably bias the pin 32 into its engaged configuration, such that the pin 32 may function as a quick-release pin, which operates as follows. To remove the bifold door 10 from the doorframe 24 with ease, a peg 40 on the pin 32 is moved through a bent slot 42 so that the pin 32 compresses the spring 38 and the pin 32 clears the bearing 34, disconnecting the hinge 22A, 22B. In the depicted embodiment, the hinge 22A, 22B includes a bracket 43 mounted on the doorframe 24 via, for example, screws or bolts 44. The bracket 43 accommodates the spherical bearing 34 therewithin, which in turn accommodates the pin 32. The spherical bearing 34 may be lubricated, self-lubricating, plastic lined, coated, grooved, straight bored, tapered bored, sealed, or unsealed, to provide merely a few examples.

As shown in FIG. 7, the spherical bearing 34 may provide the pin 32 with some degree of freedom of axial tilt, shown here as θ. For example, θ may be up to 5°, or from 0.1 to about 5°, in any direction from a rotational axis R of the hinge 22A, 22B. It is noted that the pin 32 is shown with exaggerated movement in FIG. 7 for illustration. This off-axis movement due to the spherical bearing 34 may alleviate stresses induced from axial movement, thereby reducing binding or jamming of the bifold door 10 as well as excessive wear of the hinges 22A, 22B and other components of the bifold door 10.

The three door joints discussed above (the first hinge 22A, the second hinge 22B, and the slider 28) may be provided in various configurations. The first hinge 22A may include a first pin 32A and a first bearing 34A, the second hinge 22B may include a second pin 32B and a second bearing 34B, and the slider 28 may include the third pin 32C and the third bearing 34C. In some implementations, as shown schematically in FIGS. 8A and 8B by way of example, the first hinge 22A includes the spherical bearing 34 (e.g., the first bearing 34A) and the pin 32 (e.g., the first pin 32A) having the axis of rotation R (e.g., an axis R1) configured to be tilted, while the second hinge 22B includes a cylindrical, tapered, or thrust bearing (e.g. the second bearing 34B) that is configured to fix an axis of rotation R2 of the second pin 32B and inhibit movement of the second pin 32B in an axial direction. That is, in this implementation, the second hinge 22B does not include the spherical bearing 34 which would allow for off-axis tilting of the second pin 32B. As shown in FIGS. 8C and 8D, the reverse arrangement may be utilized, in which the first hinge includes a fixed bearing such as a cylindrical, tapered, or thrust bearing, while the second hinge includes the spherical bearing 34. Preferably, only one of the hinges 22A, 22B includes the spherical bearing 34 in any given implementation, so that the other hinge 22A, 22B may provide rigidity for proper movement of the bifold door 10.

Figure 8A:
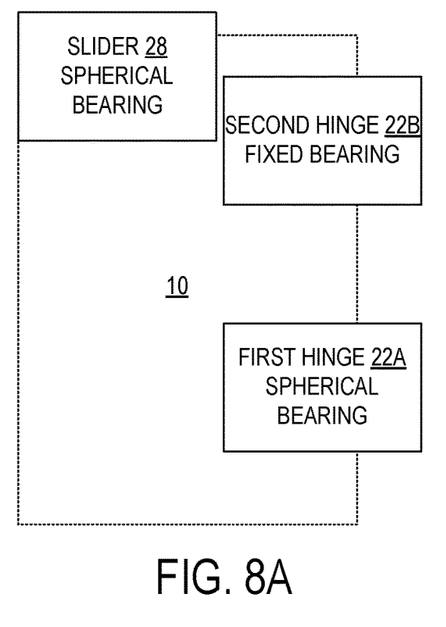
FIGS. 8A-8D schematically illustrate example arrangements of bearings in the bifold door of FIG. 1.
Figure 8B:
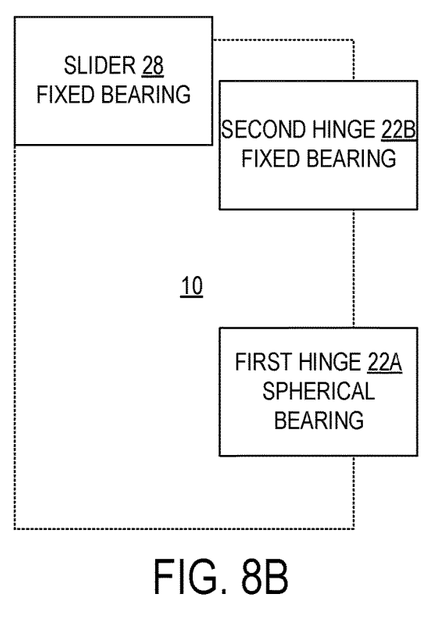
Figure 8C:
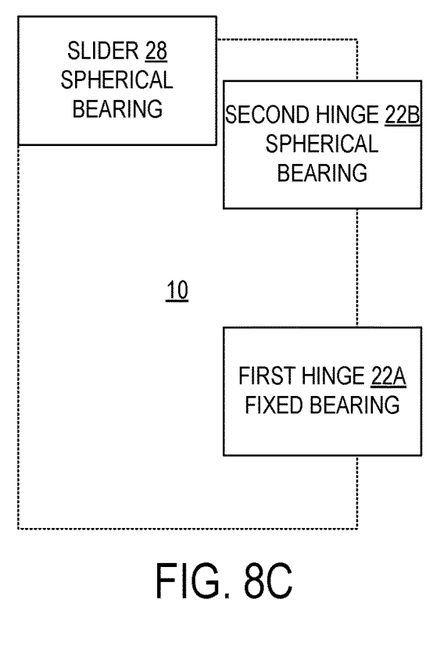
Figure 8D:
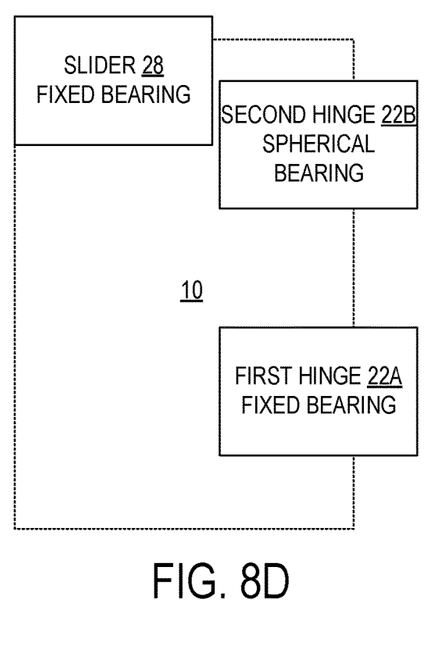

In some implementations, such as in the examples of FIGS. 8A and 8C, the slider 28 and one of the first hinge 22A and the second hinge 22B include the spherical bearing 34 and the pin 32. That is, the third bearing 34C of the slider 28 and either the first bearing 34A or the second bearing 34B are the spherical bearing 34. Alternatively, as shown in FIGS. 8B and 8D, the third bearing 34C of the slider 28 may be a fixed bearing such as a cylindrical, tapered, or thrust bearing. Thus, preferably, one or two of the three door joints have the spherical bearing 34, while the remaining one or two have a fixed bearing so that the bifold door 10 has both the flexibility to alleviate stresses and the rigidity to properly align during movement.

Figure 9A:
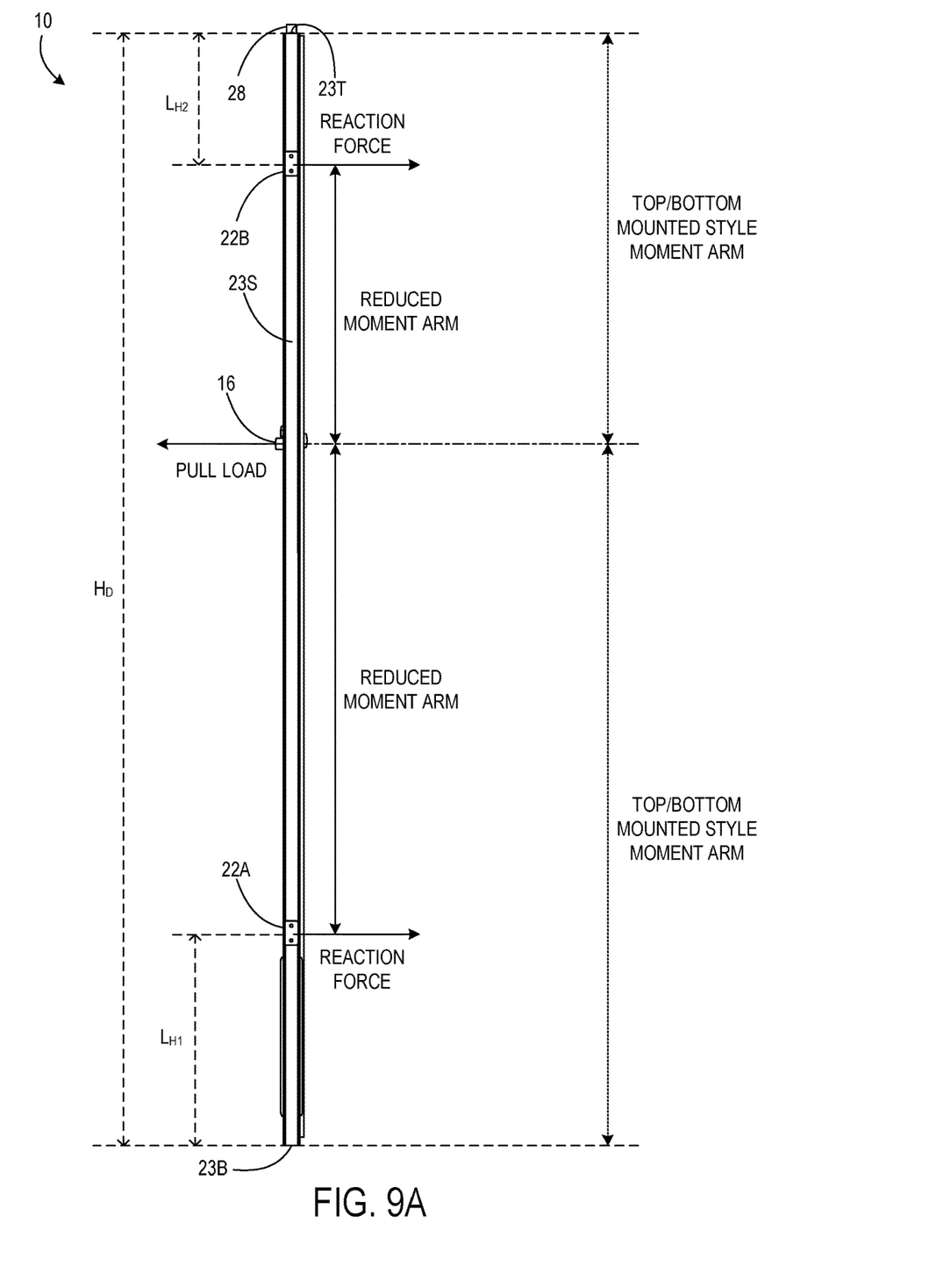
Figure 9B:
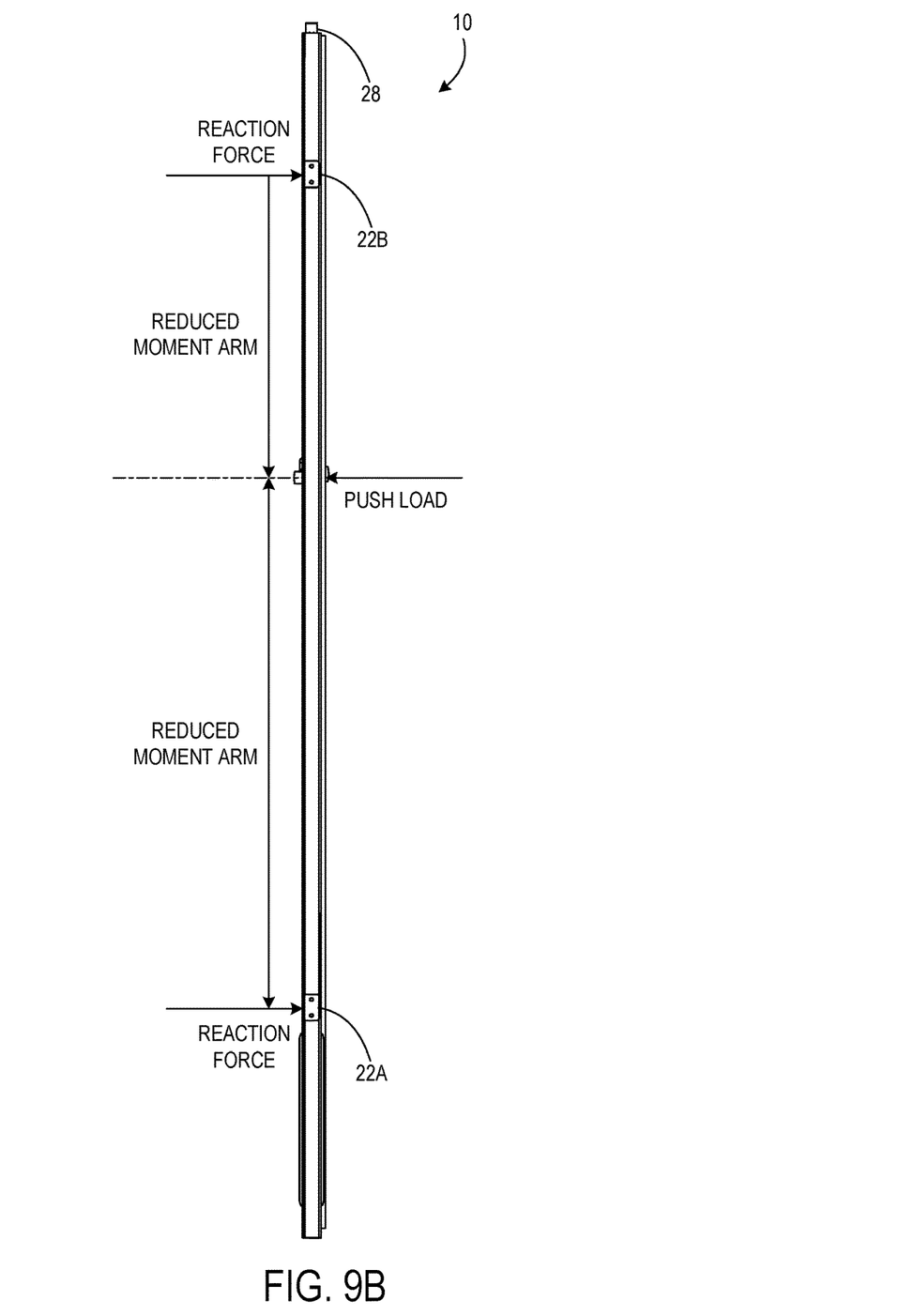

FIGS. 9A and 9B are side views of the bifold door 10. As shown, the first and second hinges 22A, 22B are both separated from a bottom edge 23B and a top edge 23T of the door panel 26A. In some implementations, the first hinge 22A is separated from the bottom edge 23B by approximately 10-35% of a height $H_D$ of the door panel 26A, and the second hinge 22B is separated from the top edge 23T by from about 10 to about 35%, or from about 15 to about 30%, or from about 15 to about 20% of the height $H_D$ of the door panel 26A. In the example illustrated in FIG. 9A, a length $L_{H1}$ from the first hinge 22A to the bottom edge 23B divided by a total height $H_D$ of the panel 26A of the bifold door 10 is approximately 12%, or from about 10 to about 30%, or from about 10 to about 15%. Similarly, a length $L_{H2}$ from the second hinge 22B to the top edge 23T divided by the height $H_D$ of the panel 26A is approximately 19%, or from about 10 to about 30%, or from about 15 to about 25%. Accordingly, when a user pulls on the bifold door (or, with reference to FIG. 9B, pushes on the bifold door), the moment arms generated by the pulling (or pushing) load and the reaction force at each hinge 22A, 22B are greatly reduced compared to a door which is attached to the doorframe 24 at only the top and bottom of the door. This reduction in moment arm may reduce the flexing of the door exhibited when the load is applied, which in turn may reduce catching or jamming of the door.

Figure 10:
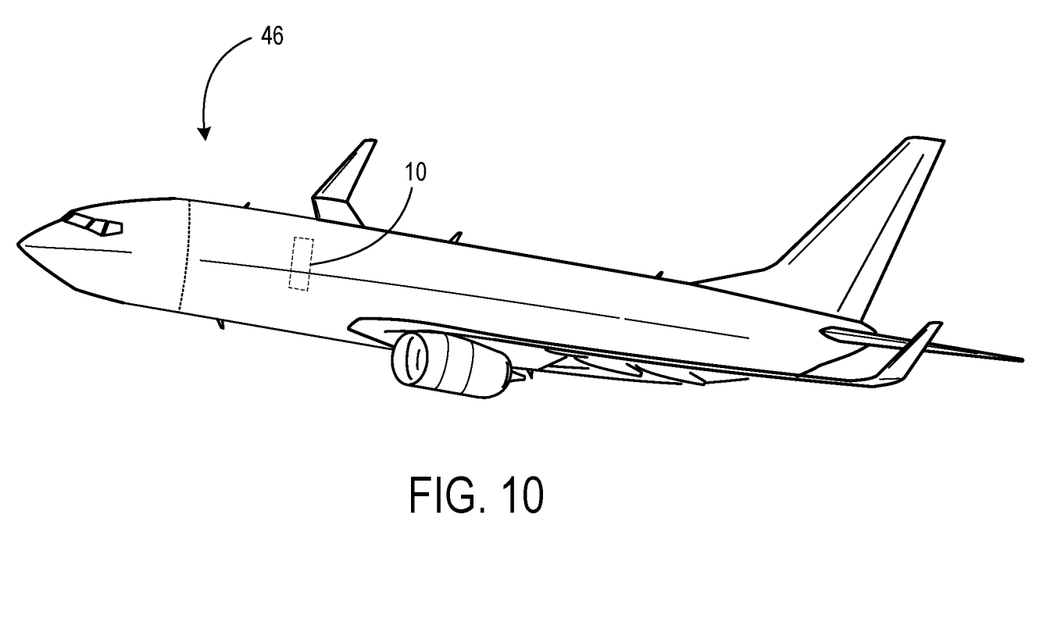
FIG. 10 shows a transportation apparatus equipped with the bifold door of FIG. 1.

The bifold door 10 is further configured to be installed in a transportation apparatus 46, in embodiments, as illustrated in FIG. 10. The transportation apparatus 46 is an aircraft, space vehicle, train, bus, or marine vessel, for example. Transportation apparatuses often have small compartments that may be opened and closed without obstructing an outside space such as a walkway, aisle, other room, etc. In one example, the bifold door 10 is a lavatory door. In another example, the bifold door 10 is a closet door. In yet another example, the bifold door 10 may be a room divider.

FIG. 11 shows a lavatory 100, which in some implementations is installed in the transportation apparatus 46. The lavatory 100 comprises the compartment 14 surrounding a lavatory space 48. The lavatory 100 further comprises the doorframe 24 in a wall 50A of the compartment 14. The lavatory 100 includes other walls such as walls 50B and 50C in order to form the compartment 14. The doorframe 24 includes the track 30 (see FIG. 5). The lavatory 100 further comprises the bifold door 10. As discussed above with reference to FIGS. 1-8D, the bifold door 10 includes the first hinge 22A and the second hinge 22B configured to rotatably couple the bifold door 10 to the doorframe 24, and a slider 28 configured to slide within the track 30 as the bifold door 10 is opened and closed. Further, at least one of the first hinge 22A, the second hinge 22B, and the slider 28 includes the spherical bearing 34 and the pin 32. The lavatory 100 be connected to an aircraft fuselage 52 via a tie rod 54.

Figure 12A:
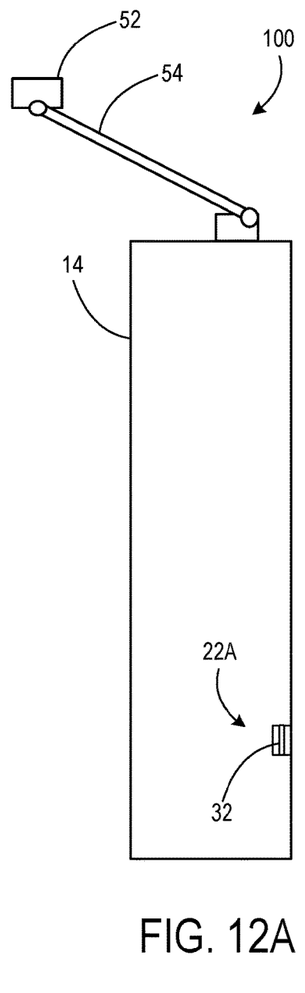
FIGS. 12A-C show examples of deformation of the lavatory of FIG. 11.
Figure 12B:
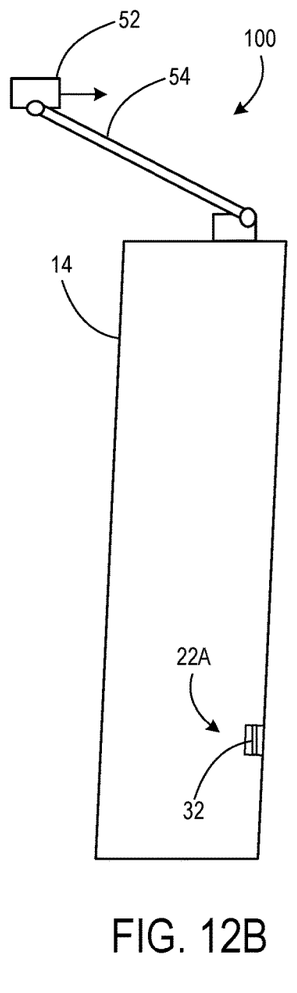
Figure 12C:
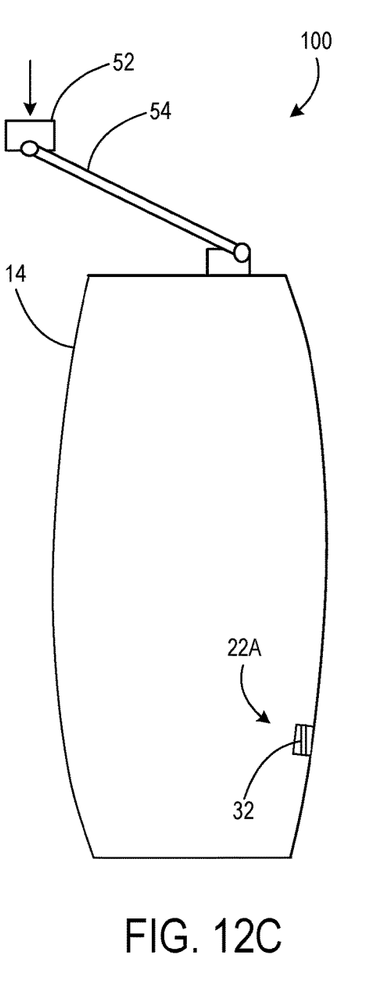

FIG. 12A schematically shows the lavatory 100 when the aircraft fuselage is not flexing, such as when the aircraft is on the ground. The bifold door 10 is removed to show the doorframe 24 of the lavatory 100, except for the hinge (here, illustrated at the first hinge 22A by way of example) which includes the spherical bearing (omitted) and the pin 32. As can be seen, the pin is positioned on-axis when no flexing occurs. However, as shown in FIG. 12B, the fuselage 52 may flex laterally, generating a large moment in the tie rod 54. As a result, the top of the lavatory 100 and doorframe 24 may skew in the direction of the flexing. However, because the spherical bearing 34 has given at least one joint a measure of flexibility, the pin 32 is able to tilt within the hinge 22A and damage to the hinge 22A hardware from stress and misalignment may be avoided. Similarly, the fuselage 52 overhead may move downward, as shown in FIG. 12C. In response, the sides of the lavatory 100 and the doorframe 24 may bow outward as the ceiling of the lavatory 100 is lowered. As with FIG. 12B, the spherical bearing 34 may allow the pin 32 to tilt within the hinge 22A.

Figure 13:
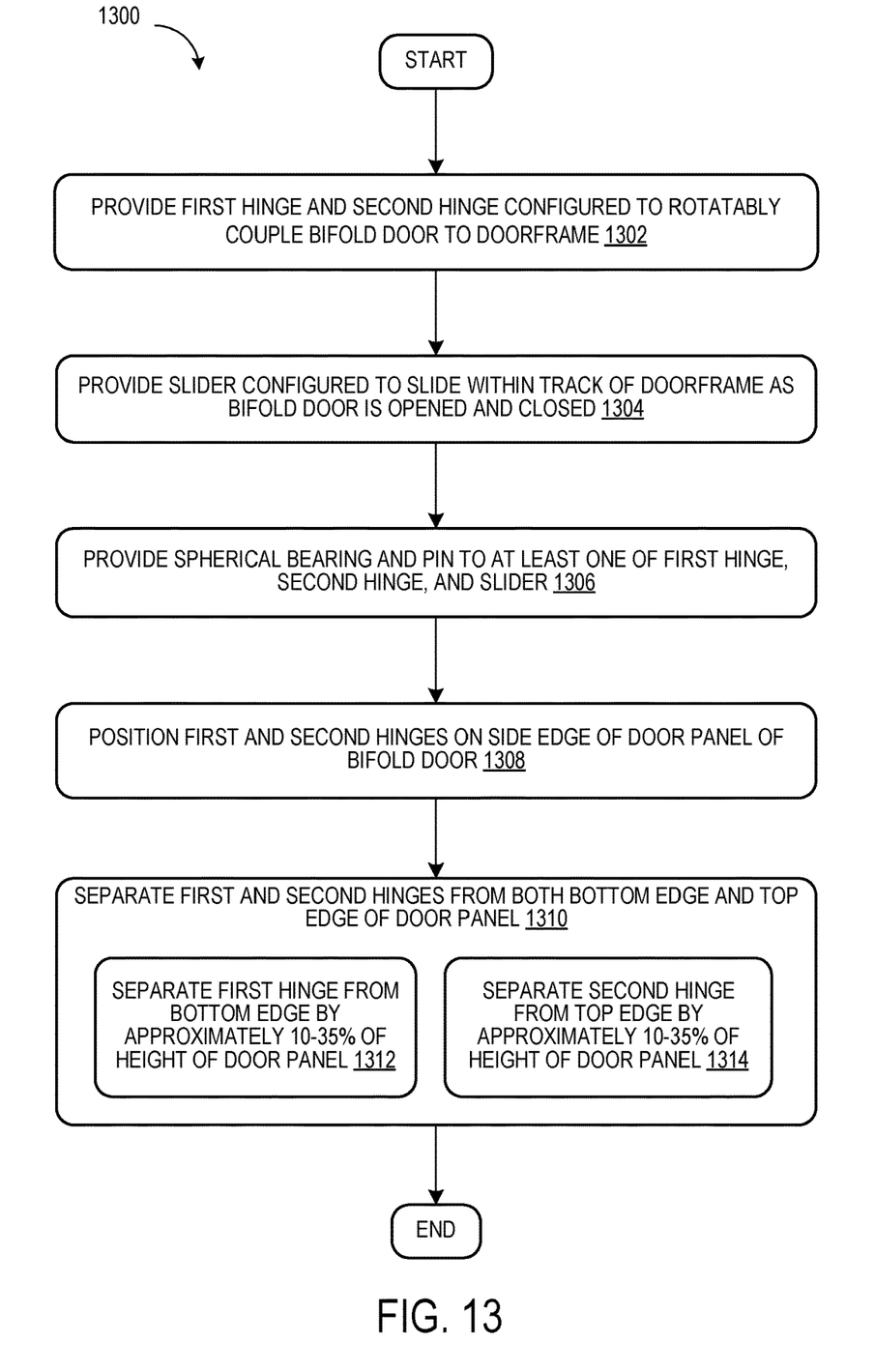
FIG. 13 is a flowchart of a method of manufacturing a bifold door according to the present disclosure.

FIG. 13 is a flowchart of a method 1300 of manufacturing a bifold door. The following description of method 1300 is provided with reference to the bifold door 10 described above and shown in FIGS. 1-3. It will be appreciated that method 1300 may also be performed in other contexts using other suitable components.

With reference to FIG. 13, at 1302, the method 1300 includes providing a first hinge and a second hinge configured to rotatably couple the bifold door to a doorframe. At 1304, the method 1300 includes providing a slider configured to slide within a track of the doorframe as the bifold door is opened and closed. At 1306, the method 1300 includes providing a spherical bearing and a pin to at least one of the first hinge, the second hinge, and the slider. In one implementation, at 1308, the method 1300 includes positioning the first and second hinges on a side edge of a door panel of the bifold door. In one implementation, at 1310, the method 1300 includes separating the first and second hinges from both a bottom edge and a top edge of the door panel. In one implementation, separating the first and second hinges comprises, at 1312, separating the first hinge from the bottom edge by approximately 10-35% of a height of the door panel, and at 1314, separating the second hinge from the top edge by approximately 10-35% of the height of the door panel.

The following paragraphs provide additional support for the claims of the subject application. One aspect provides bifold door comprising a first hinge and a second hinge configured to rotatably couple the bifold door to a doorframe, and a slider configured to slide within a track of the doorframe as the bifold door is opened and closed. At least one of the first hinge, the second hinge, and the slider includes a spherical bearing and a pin. In this aspect, additionally or alternatively, the first and second hinges are positioned on a side edge of a door panel. In this aspect, additionally or alternatively, the first and second hinges are both separated from a bottom edge and a top edge of the door panel. In this aspect, additionally or alternatively, the first hinge is separated from the bottom edge by from about 10 to about 35% of a height of the door panel, and the second hinge is separated from the top edge by from about 10 to about 35% of the height of the door panel. In this aspect, additionally or alternatively, the bifold door is configured to fold into two parts about one or more internal hinges when opened, and when folded, the bifold door is configured to protrude outward from a room or compartment to which the bifold door is installed. In this aspect, additionally or alternatively, the first hinge is positioned vertically below the second hinge, and the first hinge includes the spherical bearing and the pin. In this aspect, additionally or alternatively, the pin of the first hinge is a first pin, and the second hinge includes a cylindrical, tapered, or thrust bearing that is configured to fix an axis of rotation of a second pin and inhibit movement of the second pin in an axial direction. In this aspect, additionally or alternatively, the slider and one of the first hinge and the second hinge include the spherical bearing and the pin. In this aspect, additionally or alternatively, the bifold door is further configured to be installed in a transportation apparatus. In this aspect, additionally or alternatively, the transportation apparatus is an aircraft, train, bus, space vehicle, or marine vessel. In this aspect, additionally or alternatively, the bifold door is a lavatory door. In this aspect, additionally or alternatively, the bifold door is a closet door.

Another aspect provides a lavatory installed in a transportation apparatus. The lavatory comprises a compartment surrounding a lavatory space, a doorframe in a wall of the compartment, the doorframe including a track, and a bifold door. The bifold door includes a first hinge and a second hinge configured to rotatably couple the bifold door to the doorframe, and a slider configured to slide within the track as the bifold door is opened and closed. At least one of the first hinge, the second hinge, and the slider includes a spherical bearing and a pin. In this aspect, additionally or alternatively, the first and second hinges are positioned on a side edge of a door panel of the bifold door. In this aspect, additionally or alternatively, the first and second hinges are both separated from a bottom edge and a top edge of the door panel. In this aspect, additionally or alternatively, the first hinge is separated from the bottom edge by from about 10 to about 35% of a height of the door panel, and the second hinge is separated from the top edge by from about 10 to about 35% of the height of the door panel. In this aspect, additionally or alternatively, the bifold door is configured to fold into two parts about one or more internal hinges when opened, and when folded, the bifold door is configured to protrude outward from the lavatory. In this aspect, additionally or alternatively, the first hinge is positioned vertically below the second hinge, and the first hinge includes the spherical bearing and the pin. In this aspect, additionally or alternatively, the pin of the first hinge is a first pin, and the second hinge includes a cylindrical, tapered, or thrust bearing that is configured to fix an axis of rotation of a second pin and inhibit movement of the second pin in an axial direction. In this aspect, additionally or alternatively, the slider and one of the first hinge and the second hinge include the spherical bearing and the pin.

Another aspect provides a method of manufacturing a bifold door. The method comprises providing a first hinge and a second hinge configured to rotatably couple the bifold door to a doorframe, providing a slider configured to slide within a track of the doorframe as the bifold door is opened and closed, and providing a spherical bearing and a pin to at least one of the first hinge, the second hinge, and the slider. In this aspect, additionally or alternatively, the method further comprises positioning the first and second hinges on a side edge of a door panel of the bifold door. In this aspect, additionally or alternatively, the method further comprises separating the first and second hinges from both a bottom edge and a top edge of the door panel. In this aspect, additionally or alternatively, separating the first and second hinges comprises separating the first hinge from the bottom edge by from about 15 to about 35% of a height of the door panel, and separating the second hinge from the top edge by from about 15 to about 35% of the height of the door panel.

It will be understood that the configurations and/or approaches described herein are exemplary in nature, and that these specific embodiments or examples are not to be considered in a limiting sense, because numerous variations are possible. The specific routines or methods described herein may represent one or more of any number of strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems, and configurations, and other features, functions, acts, and/or properties disclosed herein, as well as any and all equivalents thereof.

The invention claimed is:

1. A bifold door, comprising:
a first hinge and a second hinge configured to rotatably couple the bifold door to a doorframe; and
a slider configured to slide within a track of the doorframe as the bifold door is opened and closed, wherein
at least one of the first hinge, the second hinge, and the slider includes a spherical bearing and a first pin, the spherical bearing being configured to allow the first pin to tilt axially, and
at least one of the first hinge, the second hinge, and the slider includes a second pin and a cylindrical, tapered, or thrust bearing that is configured to fix an axis of rotation of the second pin and inhibit movement of the second pin in an axial direction.

2. The bifold door of claim 1, wherein the first and second hinges are positioned on a side edge of a door panel.

3. The bifold door of claim 2, wherein the first and second hinges are both separated from a bottom edge and a top edge of the door panel.

4. The bifold door of claim 3, wherein the first hinge is separated from the bottom edge by from about 10 to about 35% of a height of the door panel, and the second hinge is separated from the top edge by from about 10 to about 35% of the height of the door panel.

5. The bifold door of claim 1, wherein
the bifold door is configured to fold into two parts about one or more internal hinges when opened, and
when folded, the bifold door is configured to protrude outward from a room or compartment to which the bifold door is installed.

6. The bifold door of claim 1, wherein
the first hinge is positioned vertically below the second hinge, and
the first hinge includes the spherical bearing and the first pin.

7. The bifold door of claim 6, wherein
the second hinge includes the cylindrical, tapered, or thrust bearing and the second pin.

8. The bifold door of claim 1, wherein the slider includes the spherical bearing and the first pin, and one of the first hinge and the second hinge includes an additional spherical bearing and additional pin.

9. The bifold door of claim 1, further configured to be installed in a transportation apparatus.

10. The bifold door of claim 9, wherein the transportation apparatus is an aircraft, train, bus, space vehicle, or marine vessel.

11. The bifold door of claim 1, wherein the bifold door is a lavatory door.

12. The bifold door of claim 1, wherein the bifold door is a closet door.

13. A lavatory installed in a transportation apparatus, the lavatory comprising:
a compartment surrounding a lavatory space;
a doorframe in a wall of the compartment, the doorframe including a track; and
a bifold door including:
a first hinge and a second hinge configured to rotatably couple the bifold door to the doorframe; and
a slider configured to slide within the track as the bifold door is opened and closed, wherein
at least one of the first hinge, the second hinge, and the slider includes a spherical bearing and a first pin, the spherical bearing being configured to allow the first pin to tilt axially, and
at least one of the first hinge, the second hinge, and the slider includes a second pin and a cylindrical, tapered, or thrust bearing that is configured to fix an axis of rotation of the second pin and inhibit movement of the second pin in an axial direction.

14. The lavatory of claim 13, wherein the first and second hinges are positioned on a side edge of a door panel of the bifold door.

15. The lavatory of claim 14, wherein the first and second hinges are both separated from a bottom edge and a top edge of the door panel.

16. The lavatory of claim 15, wherein the first hinge is separated from the bottom edge by from about 10 to about 35% of a height of the door panel, and the second hinge is separated from the top edge by from about 10 to about 35% of the height of the door panel.

17. The lavatory of claim 13, wherein
the bifold door is configured to fold into two parts about one or more internal hinges when opened, and
when folded, the bifold door is configured to protrude outward from the lavatory.

18. The lavatory of claim 13, wherein
the first hinge is positioned vertically below the second hinge, and
the first hinge includes the spherical bearing and the first pin.

19. The lavatory of claim 18, wherein
the second hinge includes the cylindrical, tapered, or thrust bearing and the second pin.

20. The lavatory of claim 13, wherein the slider includes the spherical bearing and the first pin, and one of the first hinge and the second hinge includes an additional spherical bearing and additional pin.

21. A method of manufacturing a bifold door, comprising:
providing a first hinge and a second hinge configured to rotatably couple the bifold door to a doorframe;
providing a slider configured to slide within a track of the doorframe as the bifold door is opened and closed;
providing a spherical bearing and a first pin to at least one of the first hinge, the second hinge, and the slider and allowing, via the spherical bearing, the first pin to tilt axially; and
providing a second pin and a cylindrical, tapered, or thrust bearing that is configured to fix an axis of rotation of the second pin and inhibit movement of the second pin in an axial direction to at least one of the first hinge, the second hinge, and the slider.

22. The method of claim 21, further comprising positioning the first and second hinges on a side edge of a door panel of the bifold door.

23. The method of claim 22, further comprising separating the first and second hinges from both a bottom edge and a top edge of the door panel.

24. The method of claim 23, wherein separating the first and second hinges comprises:
- separating the first hinge from the bottom edge by from about 15 to about 35% of a height of the door panel; and
- separating the second hinge from the top edge by from about 15 to about 35% of the height of the door panel.

\* \* \* \* \*